US011238111B2

(12) United States Patent
Chen et al.

(10) Patent No.: US 11,238,111 B2
(45) Date of Patent: Feb. 1, 2022

(54) RESPONSE GENERATION

(71) Applicant: International Business Machines Corporation, Armonk, NY (US)

(72) Inventors: Hao Chen, Beijing (CN); Qi Cheng Li, Beijing (CN); Shao Chun Li, Beijing (CN); Lijun Mei, Beijing (CN); Yipeng Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 15/332,564

(22) Filed: Oct. 24, 2016

(65) Prior Publication Data

US 2018/0113939 A1    Apr. 26, 2018

(51) Int. Cl.
*G06F 16/951*    (2019.01)

(52) U.S. Cl.
CPC .................................. *G06F 16/951* (2019.01)

(58) Field of Classification Search
CPC .................................................... G06F 16/951
See application file for complete search history.

(56) References Cited

U.S. PATENT DOCUMENTS

| | | | |
|---|---|---|---|
| 6,385,602 B1* | 5/2002 | Tso | G06F 16/338 |
| 7,725,485 B1* | 5/2010 | Sahami | G06F 17/3069 |
| | | | 707/766 |
| 9,020,862 B2 | 4/2015 | Ni et al. | |
| 9,110,944 B2 | 8/2015 | Brown et al. | |
| 2002/0107842 A1* | 8/2002 | Biebesheimer | G06F 16/951 |
| 2003/0061039 A1* | 3/2003 | Levin | G10L 15/26 |
| | | | 704/246 |
| 2003/0167263 A1* | 9/2003 | Sasaki | G06F 16/3347 |
| 2005/0086186 A1* | 4/2005 | Sullivan | G06N 3/0454 |
| | | | 706/16 |
| 2007/0192308 A1 | 8/2007 | Wei et al. | |
| 2008/0294637 A1 | 11/2008 | Liu | |
| 2009/0281997 A1* | 11/2009 | Jain | G06F 16/951 |

(Continued)

FOREIGN PATENT DOCUMENTS

| | | |
|---|---|---|
| CN | 101118554 A | 2/2008 |
| CN | 101174259 A | 5/2008 |
| CN | 103198155 A | 7/2013 |
| CN | 103544219 A | 1/2014 |

OTHER PUBLICATIONS

"Context Vector-Based Text Retrieval", Fair Isaac White Paper, Aug. 2003 (Year: 2003).*

(Continued)

*Primary Examiner* — Etienne P Leroux
*Assistant Examiner* — Farhad Agharahimi
(74) *Attorney, Agent, or Firm* — Amin, Turocy & Watson, LLP

(57) ABSTRACT

Techniques for response generation are provided. One computer-implemented method comprises: receiving, by an electronic device operatively coupled to a processing unit, a query from a user. The computer-implemented method also comprises generating, by the electronic device, a dialog candidates set based on user context, wherein the user context comprises the query. The computer-implemented method can also comprise generating, by the electronic device, a response based on the dialog candidates set.

20 Claims, 11 Drawing Sheets

(56) References Cited

U.S. PATENT DOCUMENTS

| | | | | |
|---|---|---|---|---|
| 2010/0174670 | A1* | 7/2010 | Malik | G06F 16/35 706/12 |
| 2013/0226953 | A1* | 8/2013 | Markovich | G06F 16/3322 707/767 |
| 2015/0066479 | A1* | 3/2015 | Pasupalak | G06F 40/40 704/9 |
| 2015/0339590 | A1* | 11/2015 | Maarek | G06F 16/33 706/12 |
| 2016/0140237 | A1* | 5/2016 | Musgrove | G06F 16/951 707/706 |
| 2016/0171119 | A1 | 6/2016 | Bufe et al. | |
| 2017/0116173 | A1* | 4/2017 | Lev-Tov | H04M 3/493 |
| 2017/0155631 | A1* | 6/2017 | Du | G06F 16/9535 |
| 2017/0243107 | A1* | 8/2017 | Jolley | G06N 5/02 |

OTHER PUBLICATIONS

Caid, "Context Vector-Based Text Retrieval", Fair Isaac White Paper, Aug. 2003 (Year: 2003).*

Quarteroni, et al., "Adaptivity in Question Answering with User Modelling and a Dialogue Interface," Proceedings of the Eleventh Conference of the European Chapter of the Association for Computational Linguistics: Posters & Demonstrations, Association for Computational Linguistics, 2006, pp. 199-202.

Harabagiu, et al., "Dialogue Management for Interactive Question Answering," FLAIRS, American Association for Artificial Intelligence, 2001, pp. 444-448.

Volkova, et al., "Lightly Supervised Learning of Procedural Dialog Systems," ACL, 2013, 11 pages.

* cited by examiner

DB2 Domain Model (Partial):

- Operating System

->Windows

->Linux

->Aix

- Version

->9.7

Installation

Configuration

->10.5

Installation

Configuration

- Installation Type

->Full Installation

->Fix Pack

FIG. 11

RESPONSE GENERATION

BACKGROUND

The subject disclosure relates to data processing, and more specifically, to response generation.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate response generation are described.

In one aspect, a computer-implemented method is proposed. The computer-implemented method can comprise receiving, by an electronic device operatively coupled to a processing unit, a query from a user. The computer-implemented method can also comprise generating, by the electronic device, a dialog candidates set based on user context, in which the user context comprises the query. The computer-implemented method can further comprise generating, by the electronic device, a response based on the dialog candidates set.

In another aspect, an electronic device is proposed. The electronic device can comprise: at least one processing unit; and a memory operatively coupled to the at least one processing unit and that stores computer executable instructions that, based on execution by the at least one processing unit, facilitate performance of acts. The acts can comprise receiving a query from a user. The acts can also comprise generating a dialog candidates set based on user context, in which the user context comprises the query. The acts can further comprise generating a response based on the dialog candidates set.

In yet another aspect, a computer program product for response generation is proposed. The computer program product can comprise a computer readable storage medium having program instructions embodied therewith. The program instructions can be executable by an electronic device to cause the electronic device to perform following acts. The acts can comprise receiving, by the electronic device, a query from a user. The acts can also comprise generating, by the electronic device, a dialog candidates set based on user context, in which the user context comprises the query. The acts can further comprise generating, by the electronic device, a response based on the dialog candidates set.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

FIG. 11 is an example, non-limiting domain model diagram in accordance with one or more embodiments of the present disclosure.

Throughout the drawings, the same or similar reference numerals represent the same or similar elements.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Automatic response generation systems can be employed in a variety of fields, including, but not limited to, Information Technology (IT) support, hotel booking, etc. A user can open a new ticket, for example, in an IT support system, and query for a response in question answering (QA) systems. In some cases, complicated context and ambiguous semantics can make the automatic conversation recommendation difficult and/or inaccurate. It is desired to have an intelligent and/or automatic system to provide a relevant response with high quality.

Figure 1:
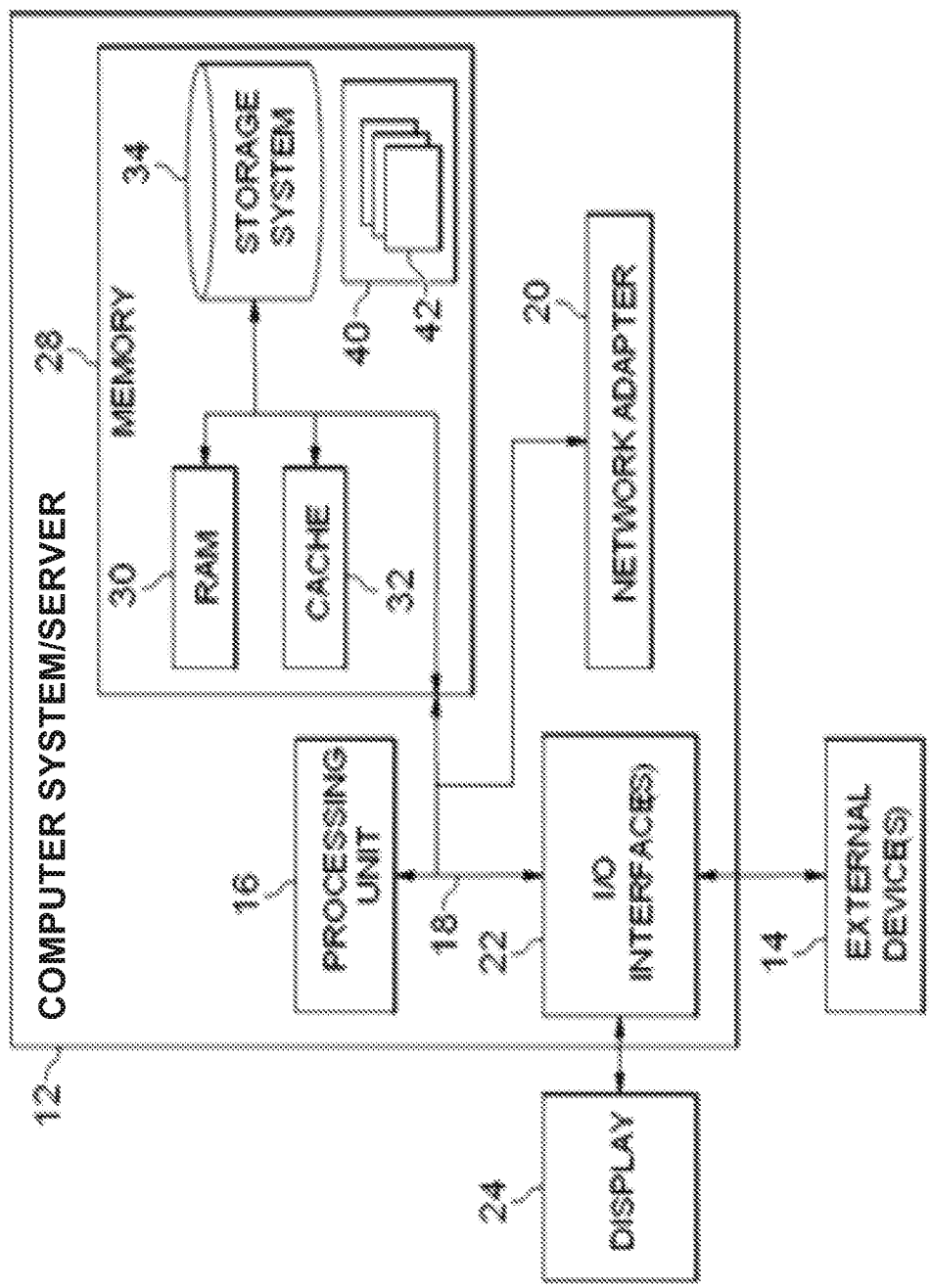
FIG. 1 is a block diagram of an example, non-limiting electronic device in which one or more embodiments of the present disclosure can be implemented.

FIG. 1 is a block diagram of an example, non-limiting electronic device in which one or more embodiments of the present disclosure can be implemented. The electronic device can be or include the computer system/server 12 in some embodiments. The computer system/server 12 can be employed to implement one or more of the embodiments of the present disclosure. Computer system/server 12 is only illustrative and is not intended to suggest any limitation as to the structure of the electronic device and/or the scope of use or functionality of embodiments of the disclosure described herein.

The components of computer system/server 12 can include, but are not limited to, one or more processing units 16, a system memory 28, and a bus 18 that couples various system components including system memory 28 to processing unit 16. As used herein, the term "processing unit" should be understood to be interchangeable with the term "processor."

Bus 18 can represent one or more of any of several types of bus structures, including a memory bus or memory controller, a peripheral bus, an accelerated graphics port or a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media can be any available media that is accessible by computer system/server 12, and it can include both volatile and non-volatile media, as well as removable and non-removable media.

System memory 28 can include computer system readable media in the form of volatile memory, such as random access memory (RAM) 30 and/or cache memory 32. Computer system/server 12 can further include other removable or non-removable, volatile or non-volatile computer system storage media. By way of example only, storage system 34 can be provided for reading from and/or writing to a non-removable, non-volatile magnetic media (not shown and typically called a "hard drive"). Although not shown, a magnetic disk drive for reading from and/or writing to a removable, non-volatile magnetic disk (e.g., a "floppy disk"), and an optical disk drive for reading from and/or writing to a removable, non-volatile optical disk such as a compact disc read-only memory (CD-ROM), digital versatile disc-read only memory (DVD-ROM) or other optical media can be provided. In such instances, one or more of the disk drives can be connected to bus 18 by one or more data media interfaces. As will be further depicted and described below, memory 28 can include at least one computer program product having a set of (or, in some embodiments, at least one) computer program modules that are configured to carry out the functions of one or more of the embodiments of the disclosure.

Program/utility 40, having a set or (or, in some embodiments, at least one) program modules 42, can be stored in memory 28. By way of example, and not limitation, other aspects that can be stored in memory 28 can include an operating system, one or more application programs, other program modules, and program data. The operating system, one or more application programs, other program modules, and/or program data or some combination thereof can include an implementation of a networking environment. Program modules 42 can generally carry out the functions and/or methodologies of one or more embodiments of the disclosure as described herein.

Computer system/server 12 can also communicate with one or more external devices 14 (e.g., a keyboard, a pointing device, a display 24), one or more devices that enable a user to interact with computer system/server 12 and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN) and/or a public network (e.g., the Internet) via network adapter 20. As depicted, network adapter 20 can communicate with the other components of computer system/server 12 via bus 18. It should be understood that although not shown, other hardware and/or software components can be used in conjunction with, or included within, computer system/server 12. Examples can include, but are not limited to: microcode, device drivers, redundant processing units, external disk drive arrays, redundant array of independent disks (RAID) systems, tape drives, and/or data archival storage systems.

Dialogs can provide knowledge bases to store relevant information in one or more different domains. For a specific domain (e.g., food, computer, software, etc.), there can be a large number of dialogs based on which a user can query for a response. To enhance the utility and intelligence of automatic response generation in complex environments, one or more embodiments of this disclosure leverages user context to select relevant dialog to generate a dialog candidates set and/or generate a response based on the dialog candidates set. For each domain (or, in some embodiments, for one or more domains), there can be a dialog tree.

Figure 2:
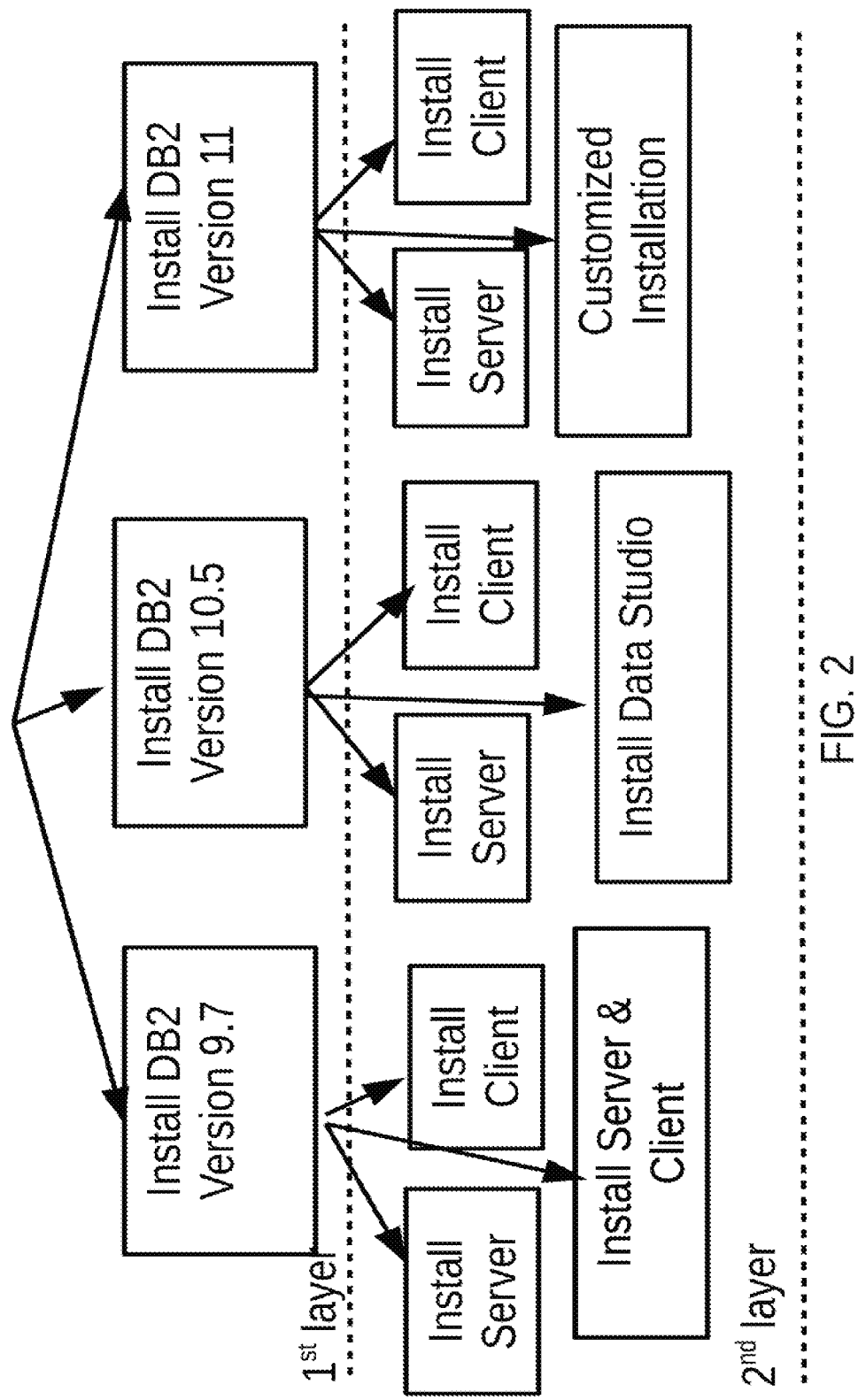
FIG. 2 is an example, non-limiting diagram of a dialog tree in accordance with one or more embodiments of the present disclosure.

FIG. 2 is an example, non-limiting diagram of a dialog tree in accordance with one or more embodiments of the present disclosure. For example, FIG. 2 is an exemplary dialog tree corresponding to a domain of a system such as DB2®. Starting from the root node, there can be three subordinate nodes in a first layer, namely "install DB2 version 9.7," "install DB2 version 10.5," and "install DB2 version 11." In some embodiments, one or more (or each) subordinate node in the dialog tree can represent a dialog. A subordinate node in the first layer can also have its own subordinate nodes that constitutes subordinate nodes in a second layer. For example, "install server," "install server&client," and/or "install client" can be subordinate nodes of "install DB2 version 9.7." For example, "install DB2 version 9.7" can represent a dialog name. The term "install server" can represent both the dialog name within the dialog "install DB2 version 9.7" and a name of another dialog called "install server." Normally there can be hundreds, thousands or even more dialogs within one domain, which can make the query search difficult and time consuming. It is desired to have an approach to locate the most relevant dialog in an efficient and effective way.

Figure 3:
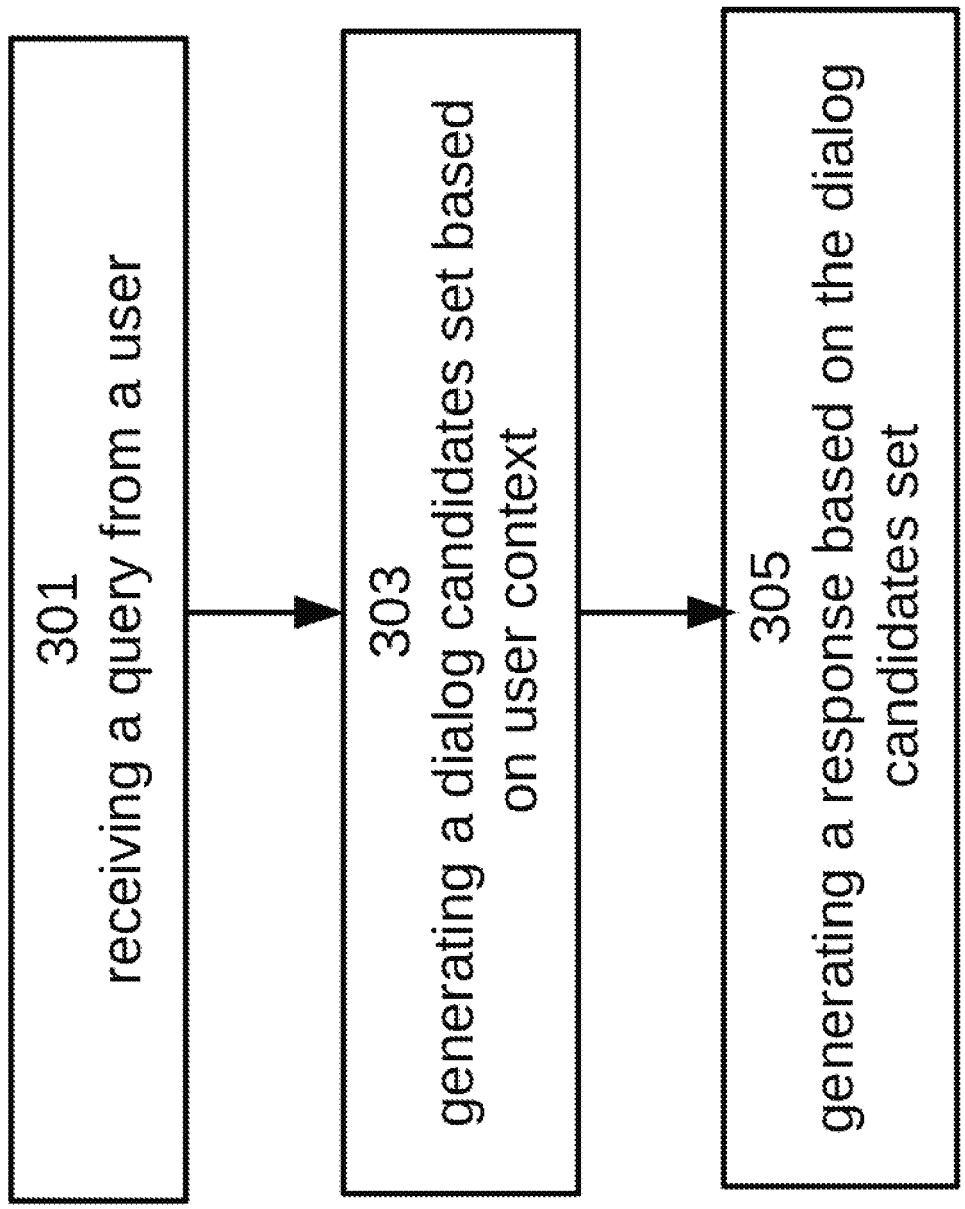
FIG. 3 is a flow chart of a response generation method in accordance with one or embodiments of the present disclosure.

FIG. 3 is a flow chart of a response generation method in accordance with one or more embodiments of the present disclosure. The method can be entered at 301, where a query from a user can be received. The query can be, for example, a question from a user such as "how to install database?" or "I want to find a hotel near an airport." The query can also be a feedback from the user in the last interaction of a conversation. For example, after the user input "I want to find a hotel near an airport," e/she can get a response, such as "are you asking the airport in city A or city B?", then the user can further input feedback such as "the airport X in city B," which can be employed as an input as a new query. It is appreciated that the query can be entered via text, speech, or any other way that can describe the query.

In 303, a dialog candidates set can be generated based on user context. The user context can comprise at least the query of the user, which can be basic information used for searching a dialog. Additionally, the user context can further comprise other items of the user such as the following: profile, location, calendar, query history, and/or the transaction history, in which the location can be a current location of the user that can be acquired via global positioning system (GPS) signal, and the calendar can include the past, current or future agenda of the user. This additional information can help to enrich the context so that a more relevant dialog can be matched and/or selected. More details regarding generating dialog candidates set will be described herein.

In 305, a response can be generated based on the dialog candidates set. The response can be a further question to the user, an answer to the query from the user, or both, so that there may be another interaction of conversation or otherwise the conversation can be ended at this interaction. The response can be text, speech, or any other format that can be appreciated by the person skilled in the art.

Figure 4:
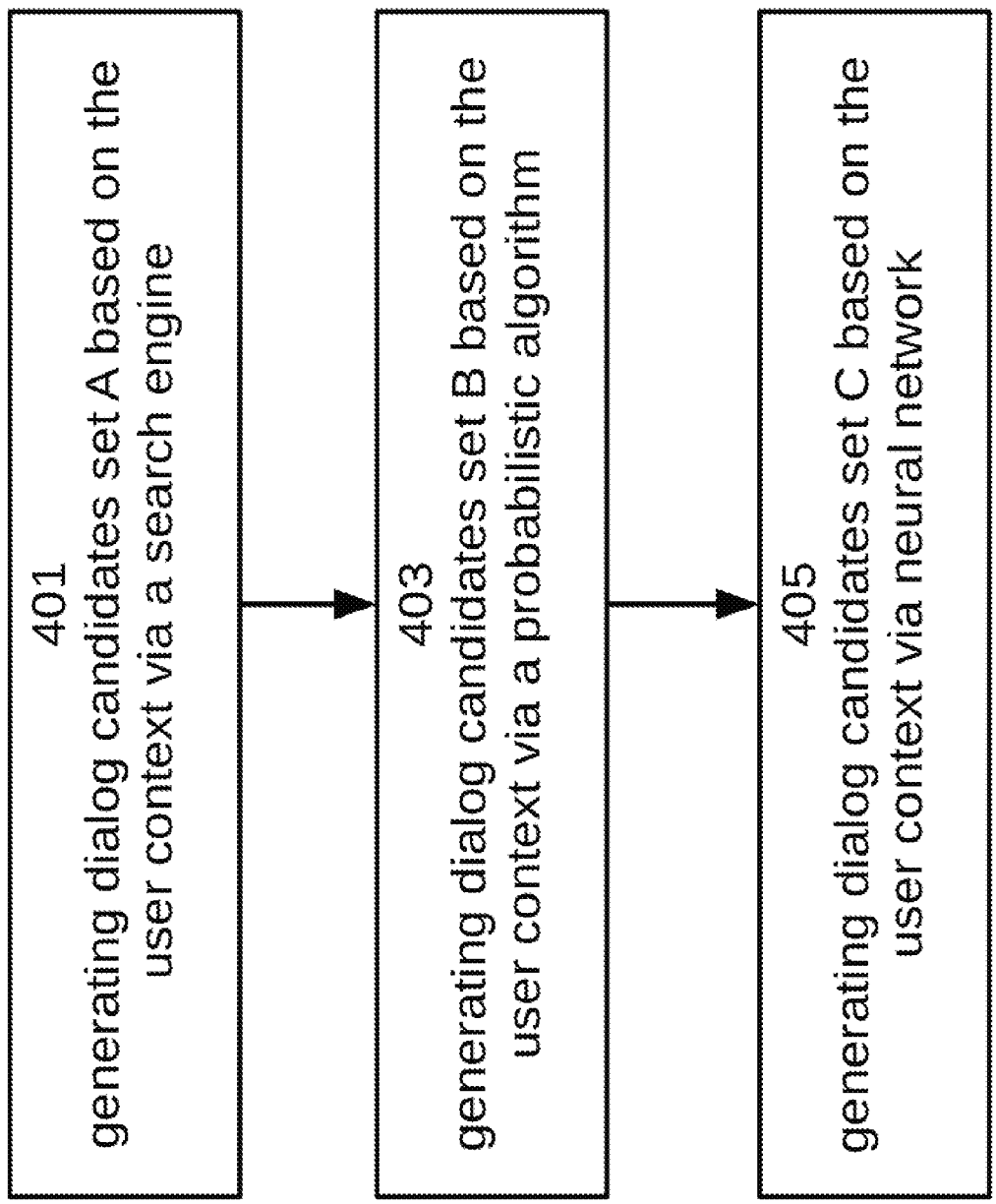
FIG. 4 is a flow chart of an example, non-limiting computer-implemented method for generating dialog candidates sets in accordance with one or more embodiments of the present disclosure.

FIG. 4 is a flow chart of an example, non-limiting computer-implemented method for generating dialog candidates sets in accordance with one or more embodiments of the present disclosure. The method can be entered at 401 where dialog candidates set A can be generated based on the user context via a search engine. A semantic algorithm can be used to extract one or more keywords from the user context and then send the one or more keywords to a search engine that is designed to search the one or more keywords from a database storing all dialogs so that the search engine can identify relevant dialogs (e.g., the top 10 dialogs for example) from the database to generate dialog candidates set A. It should be appreciated by the person skilled in the art that various semantic algorithms can be used to extract keywords in one or more of the present embodiments.

Figure 5:
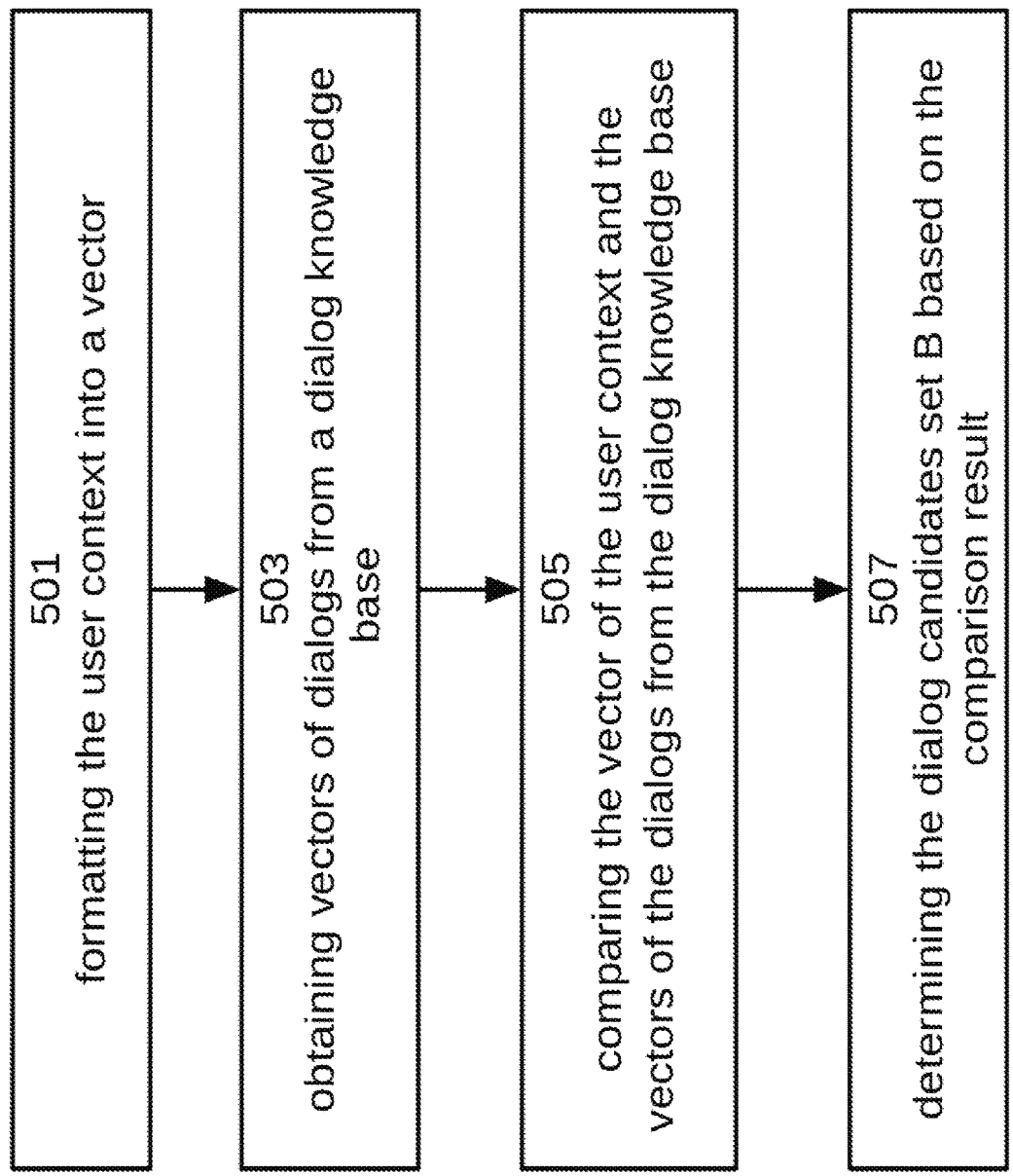
FIG. 5 is a flow chart of an example, non-limiting computer-implemented method for generating dialog candidates set B in accordance with one or more embodiments of the present disclosure.

In 403, dialog candidates set B can be generated based on the user context via a probabilistic algorithm, details of which will be further illustrated in description of FIG. 5. FIG. 5 is a flow chart of an example, non-limiting computer-implemented method for generating dialog candidates set B in accordance with one or more embodiments of the present disclosure. According to one or more embodiments of the present disclosure, dialog candidates set B can be selected from dialog candidates set A, where dialog knowledge base in 503 and 505 can be the dialog candidates set A. As such, the number of the dialog candidates can be further narrowed down.

Figure 6:
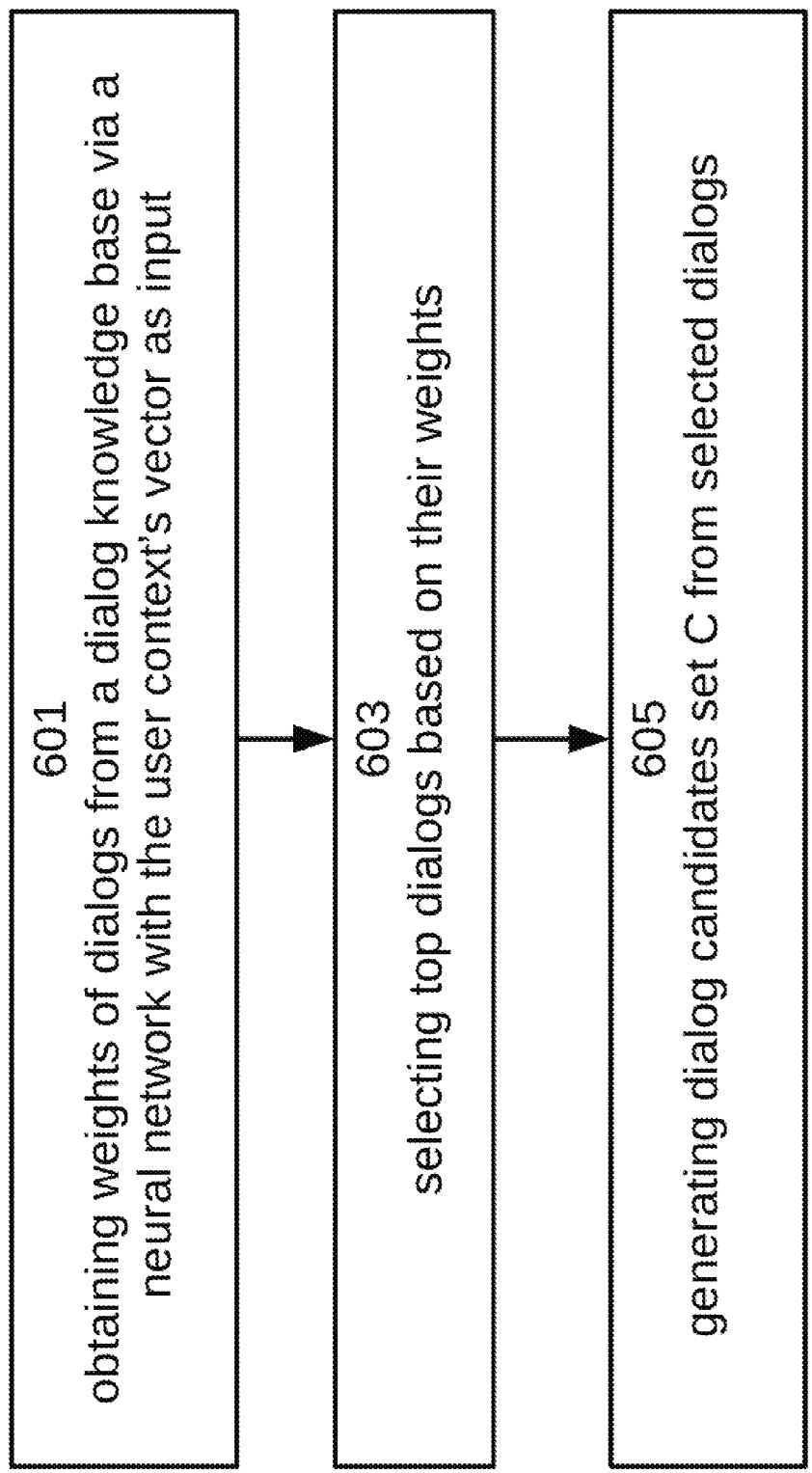
FIG. 6 is a flow chart of an example, non-limiting computer-implemented method for generating dialog candidates set C in accordance with one or more embodiments of the present disclosure.

In 405, dialog candidates set C can be generated based on the user context via neural network, details of which will be further illustrated in description of FIG. 6. FIG. 6 is a flow chart of an example, non-limiting computer-implemented method for generating dialog candidates set C in accordance with one or more embodiments of the present disclosure. According to one or more embodiments of the present disclosure, dialog candidates set C can be selected from dialogs candidates set B so that the number of the dialog candidates can be further narrowed down.

Although FIG. 4 illustrates steps 401, 403, 405 in serial order, it should be appreciated that steps 401, 403, 405 can be performed in parallel as well. In such case a final dialog candidates set D can be selected from a common set of the dialog candidates set A, B and/or C. It should also be appreciated that, depending on the size/number of the dialog candidates set and also depending on the requirement for instantaneity, steps 401, 403 and/or 405 can be used independently or in combination in a manner other than the embodiments mentioned herein (such as in an order different from the order illustrated in FIG. 4) to find relevant dialogs.

FIG. 5 is a flow chart of an example, non-limiting computer-implemented method for generating dialog candidates set B in accordance with embodiments of the present disclosure. Specifically, FIG. 5 illustrates a flow chart of generating dialog candidates set B based on the user context via a probabilistic algorithm. In 501, the user context can be formatted into a vector. Vectors can be representations of words in high dimensional space where semantically similar words are mapped into nearby points (points near one another). These representations can be subsequently used in many natural language processing applications. For example, word2vec, sentence2vec are both tools for formatting vectors. Word2vec is a two-layer neural net that processes text. Its input can be a word from text corpus and its output can be a set of vectors. Sentence2vec is a tool for mapping a sentence with arbitrary length to vector space. One example of a vector can be as follows:

sent_0  −0.000830  0.002203  −0.004999  −0.001977 −0.003532

It should be appreciated by the person skilled in the art that there are other tools to transform text into vectors. If there are multiple sentences in the user context, such as a first sentence from the user query, a second sentence from the user profile, a third sentence can be from a user location, etc. then the vector formatted can be a combination of vectors from the user query, user profile and user location. One example can be as follows, wherein the first five numbers are from vectors of the user query, the second five numbers are from user profile, and the third five numbers are from user location:

sent_0  −0.000830  0.002203  −0.004999  −0.001977 −0.003532  −0.004077  −0.003137  −0.001544  −0.001032 0.000388  −0.000808  0.001852  −0.002955  0.003781 −0.004726

In 503, vectors of dialogs from a dialog knowledge base can be obtained. In accordance with one embodiment of this disclosure, all vectors of all dialogs from the dialog knowledge base can be obtained. In accordance with another embodiment of this disclosure, only vectors of one or multiple certain layers of dialogs from the dialog knowledge base (for example, first layer and second layer of nodes in FIG. 2) can be obtained so that computation resource can be saved to focus on the high level layers. It can be appreciated that selection of layer can be evolved as the continuation of conversation so that the more rounds of conversation that are made, the deeper the layer of dialogs that can be selected. For example, in a first round of conversation, the first layer of dialogs can be selected for obtaining vectors of dialogs in step 503, and in a second round of conversation, the second layer of dialogs can be selected for obtaining vectors of dialogs, and so on. It should be appreciated that although steps 501 and 503 are shown in serial order in FIG. 5, steps 501 and 503 could also be performed in parallel, or step 503 can be performed prior to step 501.

In 505, the vector of the user context and vectors of the dialogs from the dialog knowledge base can be compared so that the dialogs that have vectors closer to that of the user context can be determined. It should be appreciated by the person skilled in the art that various probabilistic algorithm (e.g., Expectation-Maximization, Markov Decision Process, etc.) can be used to make the comparison.

In 507, dialog candidates set B can be determined based on the comparison result. For example, a certain number of nodes that have vectors closer than that of others against the vectors of the user context can be selected for dialog candidates set B. As another example, nodes with vectors whose distance to the vectors of the user context are shorter than a certain threshold can be selected for dialog candidates set B.

FIG. 6 is a flow chart of a method for generating dialog candidates set C in accordance with embodiments of the present disclosure. More specifically, dialog candidates set C was generated based on the user context via neural network. In 601, weights of dialogs from a dialog knowledge base are obtained via neural network with the user context's vector as input. A neural network can be put together by hooking together many simple "neurons" so that the output of a neuron can be the input of another neuron. A neural network can be inspired by biological neural networks, which are used to estimate or approximate functions that can depend on a large number of inputs.

Figure 7:
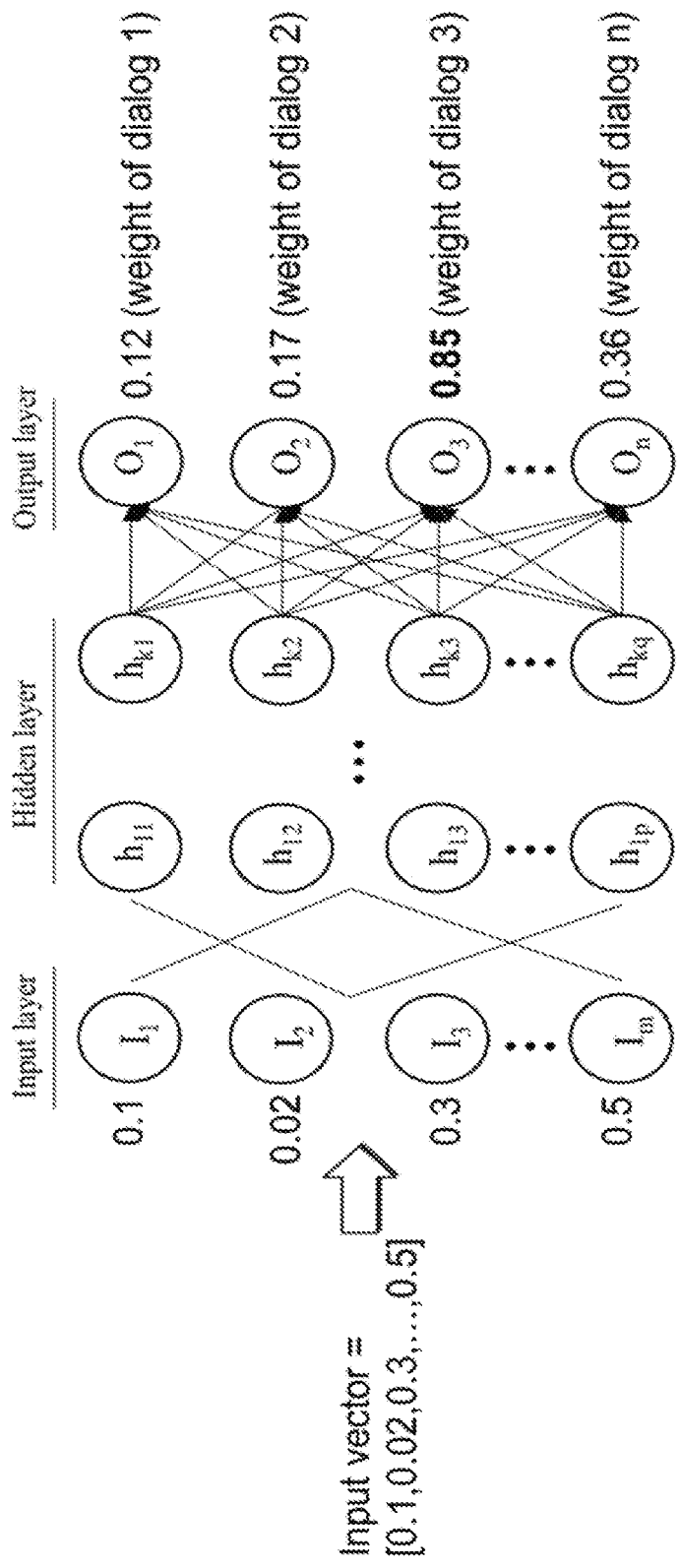
FIG. 7 is an example, non-limiting diagram of a trained neural network in accordance with one or more embodiments of the present disclosure.

FIG. 7 is an example, non-limiting diagram of a trained neural network in accordance with one or more embodiments of the present disclosure. The leftmost layer of the network can be called an "input layer." The vector of the user context, for example, can be set as an input to the neural network. The input layer in this example comprises one layer with m nodes ($I_1, I_2, I_3, \ldots I_m$). A middle layer of nodes can be called a hidden layer because its values are not observed. The hidden layer in this example can comprise k layers, each of which (or, in some embodiments, one or more of which) has t nodes(t=p, q or another integer). The rightmost layer can be the output layer. Weights of dialogs, for example, can be output by the neural network. The output layer in this example can comprises one layer with nodes, each of which (or, in some embodiments, one or more of which) representing a weight of a dialog. The weight of a dialog can represent the relationship between each dialog (or, in some embodiments, one or more dialogs) and the user context. For example, 0.85 as a highest weight in FIG. 7 can indicate dialog 3 as the most relevant dialog. If dialog candidates set C is selected from dialog candidates set B, then the dialog knowledge base in step 601 can be dialog candidates set B.

Figure 8:
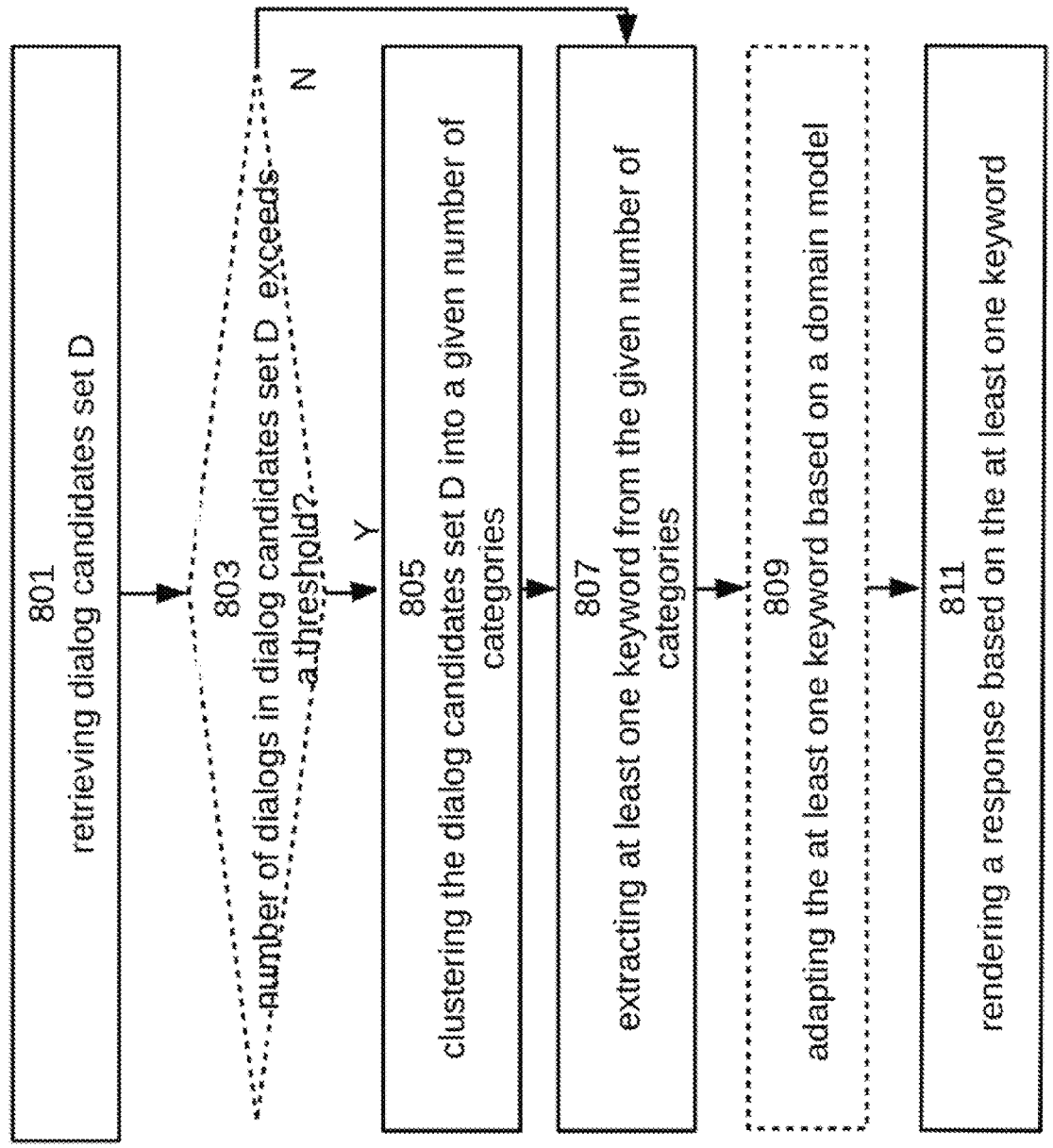
FIG. 8 is a flow chart of an example, non-limiting computer-implemented method for generating a response in accordance with one or more embodiments of the present disclosure.

In 603, top dialogs can be selected based on their weights. The top dialogs can be selected from the dialogs whose weights exceed a threshold (threshold A for example), or alternatively can be selected from a certain number of dialogs with highest weights (e.g., the top10 dialogs for example). In 605, dialog candidates set C can be generated from selected dialogs. FIG. 8 is a flow chart of an example, non-limiting computer-implemented method for generating a response in accordance with one or more embodiments of the present disclosure. In 801, dialog candidates set D can be retrieved. The dialog candidates set D can be either dialog candidates set A, B, or C or any combination of them.

It should be appreciated that the dashed line in the flow chart can indicate that steps below the dashed line (steps 803, 809) are optional. For example, in 803, it can be determined whether number of dialogs in the dialog candidates set D exceeds a threshold (threshold B for example). Once the number of dialogs in the dialog candidates set D exceeds the threshold B, it can mean there may still be a large number of dialogs that can result in a dispersed distribution of dialogs and hence make it difficult to shape a relevant response. Therefore, further processing can be employed to generalize the content of dialogs so that more meaningful questions can be asked at the end of this conversation. This further processing will be described in detail in 805. If the number of dialogs in the dialog candidates set D does not exceed the threshold B, step 807 can be performed, which will be described in detail hereinafter. It should also be appreciated that step 803 may not be always employed. For example, once the number of dialogs have been managed previously in step 603 of FIG. 6, where a certain number of dialogs with highest weights are selected as top dialogs, then there may be no need to further control the number of dialogs in step 803.

Figure 9:
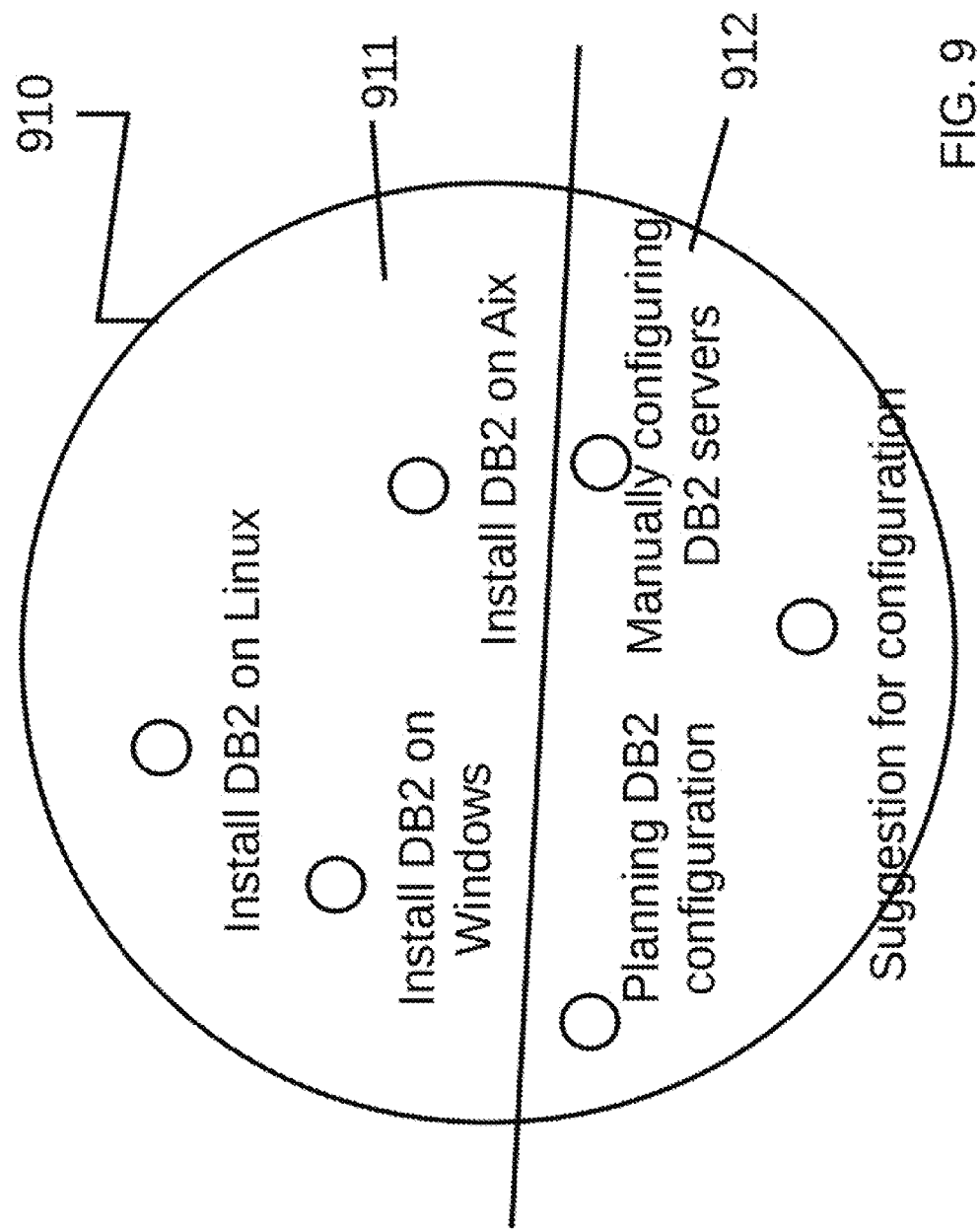
FIG. 9 is an example, non-limiting diagram to facilitate clustering dialog candidates set in accordance with one or more embodiments of the present disclosure.

Therefore, in 805, in response to the number of dialogs exceeding the threshold B, dialog candidates set D can be further clustered into a defined number of categories. Step 805 can be further illustrated by referring to FIG. 9 and FIG. 10. FIG. 9 is an example, non-limiting diagram to facilitate clustering dialog candidates set in accordance with one or more embodiments of the present disclosure. In response to a user input "how to install database?" as a query, dialog candidates set D, which can include 6 dialogs, can be retrieved as illustrated in Circle 910. These 6 dialogs can be clustered into 2 of categories, wherein category 911 can include three dialogs, namely "install DB2 on Linux," "install DB2 on Windows," and "install DB2 on Aix" and category 912 can include three dialogs, namely "planning DB2 configuration," "manually configuring DB2 servers," and "suggestion for configuration." In some embodiments, the number of categories can be set in advance according to experience of person skilled in the art. There are various approaches to cluster dialogs. For example, dialogs can be formatted into vectors first, and then hierarchical clustering can be applied to categorize these vectors into 2 categories. It should be appreciated by the person skilled in the art that any other clustering technique can also be used in this regards to categorize dialogs.

In 807, at least one keyword can be extracted from the defined number of categories. For example, since phrase "install DB2" exists in each dialog of category 911 and phrase "configuration" exists in each dialog category 912, they can be both extracted as keywords. For another example, all phrases from each dialog in dialog candidates set D can be extracted as keywords.

Optionally, in 809, extracted keyword can be further adapted based on a domain model. Since the extracted keywords may not include a standardized or generalized term for use in follow up response rendering step 811, a domain model can provide an approach to further adapt keywords into a standardized or generalized term. For the purpose of clarity, "adapting" here can be either changing the expression of keywords, expanding more keywords based on previously extracted keywords, or both. For example, "Windows," "Linux" and "Aix" can be extracted as keywords in step 807 by checking at the domain model in FIG. 11, which can be a domain model diagram for DB2, "operation system" can be further added as an expanded keyword.

In 811, a response can be rendered based on the at least one keyword. For example, a response can be a further question such as "are you going to install DB2 or configure DB2?", "are you going to install DB2 version 10.5, 9.7 or 11?", etc. The question can be rendered based on a question template, which can provide a certain type of format for shaping a question. It should also be appreciated that the response can also be an answer instead of a further question.

Figure 10:
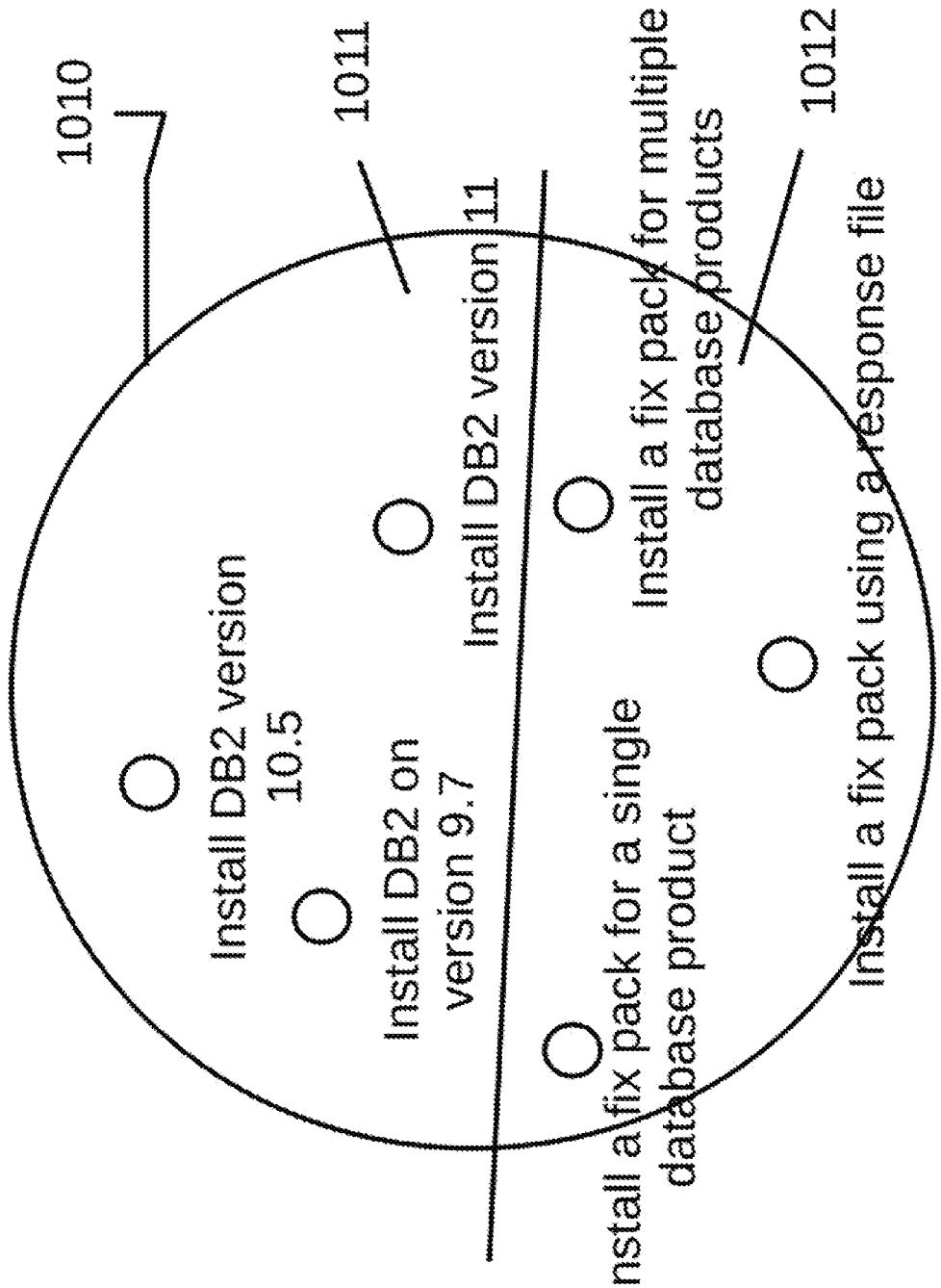
FIG. 10 is another example, non-limiting diagram to facilitate clustering the dialog candidates set in accordance with one or more embodiments of the present disclosure.

If the user inputs "Windows" as a feedback to the question rendered, aiming to find help for installing DB2® on Windows®, steps 801 to 811 can be executed again for a second round. FIG. 10 is another example, non-limiting diagram to facilitate clustering the dialog candidates set in accordance with one or more embodiments of the present disclosure. Circle 1010 illustrates dialog candidates set D in the second round, category 1011 and category 1012 includes 3 dialogs respectively. A further response rendered in 811 can be: "ask about installing which DB2 version on Windows please press 1, or you can directly input 9.7, 10.5, 11 for fast inquiry, ask about which method to install DB2 fix pack please press 2, or you can directly input single database product name for fast inquiry." Therefore a multi-round conversion can be generated automatically. It should be appreciated that feedback from the user can be further re-entered into the neutral network to train the neutral network. It should also be appreciated by the person skilled in the art that one or more of the methods described hereinabove in this disclosure can be implemented in the computer system/server 12 as shown in FIG. 1.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by an electronic device operatively coupled to a processing unit, a query from a user;
   obtaining, by the electronic device, a first vector of a user context of the user;
   selecting, by the electronic device, one or more layers of layers of nodes from dialog trees of domains of a dialog knowledge base, wherein the nodes comprise respective dialogs;
   obtaining, by the electronic device, second vectors for corresponding dialogs from corresponding nodes of the one or more layers;
   generating, by the electronic device, a first set of dialog candidates based on the query, the first vector, and the second vectors;
   obtaining, by the electronic device, weights of the dialogs from the dialog knowledge base;
   generating, by the electronic device, a second set of dialog candidates based on the query, the first vector and the weights of the dialogs;
   generating, by the electronic device, a third set of dialog candidates comprising dialog candidates present in both the first set of dialog candidates and the second set of dialog candidates;
   clustering, by the electronic device, the third set of dialog candidates into clusters based on one or more hierarchal clustering techniques;
   extracting, by the electronic device, respective keywords from the clusters based on a domain model;
   identifying, by the electronic device, an expanded keyword that is a generalized term to represent the respective keywords based on the domain model; and
   generating, by the electronic device, a response based on the third set of dialog candidates and the expanded keyword, wherein the response comprises a question to the user comprising the expanded keyword.

2. The computer-implemented method of claim 1, wherein the user context is based on at least one of a profile, a location, a query history and a transaction history.

3. The computer-implemented method of claim 1, wherein the query comprises feedback of the user from a last interaction of the user, and the selecting one or more layers is based on a quantity of interactions of the user.

4. The computer-implemented method of claim 1, wherein
   generating the first set of dialog candidates employs via a probabilistic algorithm.

5. The computer-implemented method of claim 1,
   wherein the generating the first set of dialog candidates comprises determining the first set of dialog candidates based on a result of comparison between the first vector and the second vectors.

6. The computer-implemented method of claim 1, wherein the generating the second set of dialog candidates employs a neural network.

7. The computer-implemented method of claim 1, further comprising:
   selecting, by the electronic device, top dialogs based on the weights of the dialogs from the dialog knowledge base; and
   generating, by the electronic device, the second set of dialog candidates from the top dialogs.

8. The computer-implemented method of claim 1, further comprising:
   receiving a user response to the question; and
   selecting a cluster of the clusters based on the user response.

9. An electronic device, comprising:
   at least one processing unit; and
   a memory operatively coupled to the at least one processing unit and that stores computer executable instructions that, based on execution by the at least one processing unit, facilitate performance of operations, comprising:
   receiving a query from a user;
   obtaining a first vector of a user context of the user;
   selecting one or more layers of layers of nodes from dialog trees of domains of a dialog knowledge base, wherein the nodes comprise respective dialogs;
   obtaining second vectors for corresponding dialogs from corresponding nodes of the one or more layers;
   generating a first set of dialog candidates based on the query, the first vector, and the second vectors;
   obtaining weights of the dialogs from the dialog knowledge base;
   generating a second set of dialog candidates based on the query, the first vector, and the weights of the dialogs;
   generating a third set of dialog candidates comprising dialog candidates present in the first set of dialog candidates and the second set of dialog candidates;

clustering the third set of dialog candidates into clusters based on one or more hierarchal clustering techniques;
extracting respective keywords from the clusters based on a domain model;
identifying an expanded keyword that is a generalized term to represent the respective keywords based on the domain model; and
generating a response based on the third set of dialog candidates and the expanded keyword, wherein the response comprises a question to the user comprising the expanded keyword.

10. The electronic device of claim 9, wherein the generating the third set of dialog candidates comprises:
generating the third set of dialog candidates further based on the user context via a search engine.

11. The electronic device of claim 9, wherein the generating the first set of dialog candidates
employs a probabilistic algorithm.

12. The electronic device of claim 9, wherein the generating the first set of dialog candidates comprises:
determining the first set of dialog candidates based on a result of a comparison between the first vector and the second vectors.

13. The electronic device of claim 9, wherein the generating the second set of dialog candidates
employs a neural network.

14. The electronic device of claim 13, wherein the generating the second set of dialog candidates comprises:
selecting top dialogs based on the weights of the dialogs; and
generating the second set of dialog candidates from the top dialogs.

15. The electronic device of claim 9, wherein the operations further comprise:
receiving a user response to the question; and
selecting a cluster of the clusters based on the user response.

16. A computer program product for response generation, the computer program product comprising a computer readable storage medium having program instructions embodied therewith, the program instructions executable by a processor to cause the processor to:
receive, by the processor, a query from a user;
obtain, by the processor, a first vector of a user context of the user;
select, by the processor, one or more layers of layers of nodes from dialog trees of domains of a dialog knowledge base, wherein the nodes comprise respective dialogs;
obtaining, by the processor, second vectors for corresponding dialogs from corresponding nodes of the one or more layers;
generate, by the processor, a first set of dialog candidates based on the query, the first vector, and the second vectors;
obtain, by the processor, weights of the dialogs from the dialog knowledge base;
generate, by the processor, a second set of dialog candidates based on the query, the first vector and the weights of the dialogs;
generate, by the processor, a third set of dialog candidates comprising dialog candidates present in both the first set of dialog candidates and the second set of dialog candidates;
cluster, by the processor, the third set of dialog candidates into clusters based on one or more hierarchal clustering techniques;
extract, by the processor, respective keywords from the clusters based on a domain model;
identify, by the processor, an expanded keyword that is a generalized term to represent the respective keywords based on the domain model; and
generate, by the processor, a response based on the third set of dialog candidates and the expanded keyword, wherein the response comprises a question to the user comprising the expanded keyword.

17. The computer program product of claim 16, wherein the user context is based on at least one of a profile, a location, a query history and a transaction history.

18. The computer program product of claim 16, wherein the program instructions are further executable by the processor to cause the processor to:
receive, by the processor, a user response to the question; and
select, by the processor, a cluster of the clusters based on the user response.

19. The computer program product of claim 18, wherein the program instructions are further executable by the processor to cause the processor to:
generate, by the processor, an additional question to the user based on at least one dialog candidate selected from the cluster.

20. The computer program product of claim 19, wherein the additional question comprises at least one term extracted from the at least one dialog candidate selected from the cluster.

* * * * *